United States Patent
VanKerschaever et al.

(10) Patent No.: US 12,191,707 B2
(45) Date of Patent: Jan. 7, 2025

(54) SINGLE BATTERY SWITCHABLE FLOAT POWER SYSTEM

(71) Applicant: Universal City Studios LLC, Universal City, CA (US)

(72) Inventors: Morris Andre VanKerschaever, Orlando, FL (US); Joseph Daniel Madden, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 158 days.

(21) Appl. No.: 17/871,448

(22) Filed: Jul. 22, 2022

(65) Prior Publication Data
US 2024/0030740 A1    Jan. 25, 2024

(51) Int. Cl.
*H02J 9/06*    (2006.01)
*H02J 7/00*    (2006.01)

(52) U.S. Cl.
CPC ............ *H02J 9/061* (2013.01); *H02J 7/0013* (2013.01); *H02J 2207/20* (2020.01)

(58) Field of Classification Search
CPC ....... H02J 9/061; H02J 7/0013; H02J 2207/20
USPC ..................................................... 307/82, 71
See application file for complete search history.

(56) References Cited

U.S. PATENT DOCUMENTS

| | | | | |
|---|---|---|---|---|
| 8,134,820 | B1* | 3/2012 | Riccio | H02H 3/247 361/4 |
| 8,866,441 | B2* | 10/2014 | Weng | H01M 10/441 307/66 |
| 2014/0111000 | A1* | 4/2014 | Cooney | H01R 13/645 29/857 |
| 2018/0027630 | A1* | 1/2018 | DeJonge | H05B 33/02 315/86 |
| 2020/0028439 | A1* | 1/2020 | Smith | H02M 3/33507 |
| 2023/0347841 | A1* | 11/2023 | Hunley | B60W 10/26 |
| 2023/0396062 | A1* | 12/2023 | Mills-Price | H02J 7/35 |

FOREIGN PATENT DOCUMENTS

| | | |
|---|---|---|
| CN | 106026368 A | 10/2016 |
| CN | 211209371 U | 8/2020 |
| CN | 113767340 A | 12/2021 |
| WO | 2014198861 A1 | 12/2014 |

OTHER PUBLICATIONS

PCT/US2023/028259 International Search Report and Written Opinion mailed Nov. 29, 2023.

* cited by examiner

*Primary Examiner* — Michael R. Fin
(74) *Attorney, Agent, or Firm* — Fletcher Yoder, P.C.

(57) ABSTRACT

A power system for a parade float includes a first power source, a second power source, and an interlocked contactor. The power system also includes a selector switch coupled to the interlocked contactor, wherein the interlocked contactor is configured, in response to selection of a power source from among the first power source and the second power source with the selector switch, to switch between the first power source and the second power source for outputting power to the parade float with the selected power source.

13 Claims, 17 Drawing Sheets

SINGLE BATTERY SWITCHABLE FLOAT POWER SYSTEM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Since the early twentieth century, amusement parks (or theme parks) have substantially grown in popularity. One of the attractions at amusement parks is a parade featuring themed parade floats having a variety of features (e.g., lighted features, features that move, special effect features, etc.). As parade floats get larger, they may include many more features (e.g., lights) that consume power. Some of these features may utilize different output voltages from the power system. However, parade floats have limited space for the power system, especially a power system utilizing multiple batteries for outputting different voltages. In addition, when the parade is utilized in a static mode, the extent of time to utilize the parade float may be limited if the batteries cannot be charged quickly enough to keep up with power consumption. Accordingly, it may be desirable to provide a power system for a parade float that provides greater flexibility.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a power system for a parade float includes a first power source, a second power source, and an interlocked contactor. The power system also includes a selector switch coupled to the interlocked contactor, wherein the interlocked contactor is configured, in response to selection of a power source from among the first power source and the second power source with the selector switch, to switch between the first power source and the second power source for outputting power to the parade float with the selected power source.

In an embodiment, a parade float includes a power system. The power system includes a battery bank. The power system also includes a plurality of direct current (DC)/DC converters coupled to the battery bank and configured to provide power at proper output voltages to the parade float. The power system further includes a plurality of alternating current (AC)/DC converters configured to couple to an AC power source and to provide power at the proper output voltages to the parade float. The power system still further includes an interlocked contactor coupled to at least one DC/DC converter of the plurality of DC/DC converters and to at least one AC/DC converter of the plurality of AC/DC converters. The power system yet further includes a selector switch coupled to the interlocked contactor, wherein the interlocked contactor is configured, in response to selection of a power source from among the battery bank and the AC power source with the selector switch, to switch between the battery bank and the AC power source for outputting power to the parade float with the selected power source.

In an embodiment, a method for controlling a power system for a parade float includes receiving, via a selector switch coupled to an interlocked contactor, a selection of a power mode from among alternating current (AC) mode and direct current (DC) mode, wherein the interlocked contactor is coupled to a plurality of DC/DC converters and a plurality of AC/DC converters, and the plurality of the DC/DC converters and the plurality of AC/DC converters are configured to provide power at proper output voltages to the parade float. The method also includes, in response to the DC mode being selected, outputting power to the parade float via the plurality DC/DC converters coupled to a battery bank located on the parade float. The method further includes, in response to the AC mode being selected, outputting power to the parade float via the plurality of AC/DC converters coupled to an AC power source. The interlocked contactor enables only a single power source at a time from among the battery bank and the AC power source to power the parade float.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 6A-1-6A-3 and 6B-1-6B3 are schematic views of a power system for a float having a primary power system and an additional power system for a dimmer system, respectively, in accordance with an aspect of the present disclosure;

DETAILED DESCRIPTION

Figure 1:
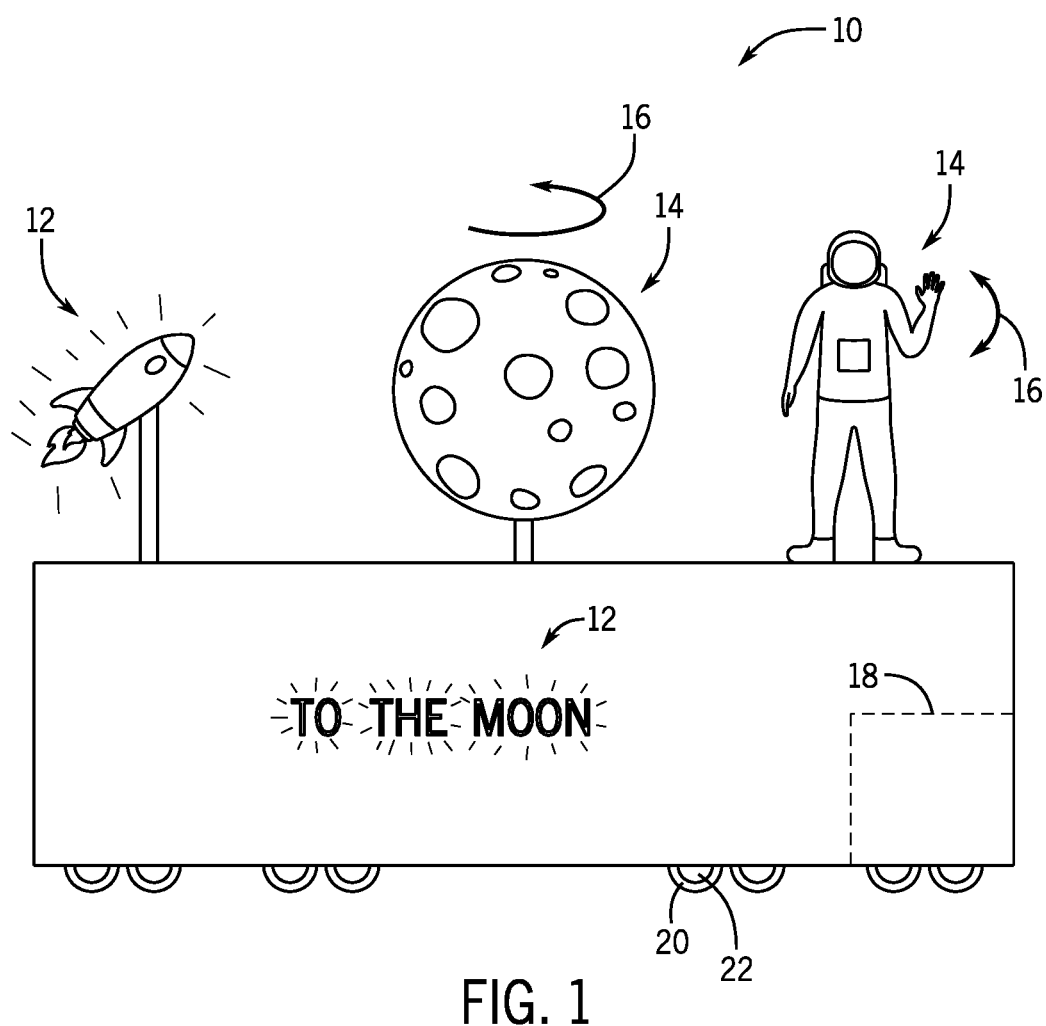
FIG. 1 is a schematic view of a float that utilizes a switchable source float power system, in accordance with an aspect of the present disclosure.

The present disclosure relates generally to parade floats. More specifically, embodiments of the present disclosure relate to a power system for a parade float.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments of the disclosure are directed to systems and methods for powering a float (e.g., parade float) with a power system (e.g., switchable source float power system). For example, the disclosed systems and methods include a power system that includes a first power source, a second power source, an interlocked contactor (i.e., pair of contactors interlocked but with the crossover bridge removed such as a reversing contactor with the crossover bridge removed), and a selector switch coupled to the interlocked contactor. The interlocked contactor is configured, in response to selection of a power source from among the first power and the second power source, to switch between the first power source and the second power source for outputting power to the float with the selected power source. The interlocked contactor utilizes a parallel bridge on an output side of the interlocked contactor and lacks a crossover bridge for crossing over AC phases. The power system (and interlocked contactor) enables only a single power source at a time (from among the first power source and the second power source) to power the float. In certain embodiments, the first power source and the second power source include different battery banks. In certain embodiments, the first power source includes a battery bank (utilized in DC mode) and the second power source includes an AC power source (e.g., building power from a building utilized in AC mode). In DC mode, a plurality of DC/DC converters coupled to the battery bank are configured to provide power at proper output voltages to the float. In AC mode, a plurality of AC/DC converters are configured to couple to an AC power source (e.g., via standard wall circuits (i.e., electrical outlets)) and to provide power at the proper output voltages to the float. One or more of the proper output voltage may vary. The disclosed systems and methods enable a tool-free changeover between power sources. In addition, the disclosed systems and methods enable the float to run for extended periods of time in a static display mode. Further, the disclosed systems and methods enable providing different output voltages without having to utilize multiple different batteries (or battery banks) at different voltages which can take up a lot of space and be expensive.

FIG. 1 is a schematic view of a float 10 (e.g., parade float) that utilizes a power system (e.g., switchable source float power system). The float 10 may include many features or elements that require power. The features or elements may be part of an overall theme for the float. As depicted in FIG. 1, the float 10 includes light features 12 (i.e., features that are lighted). The number of light features 12 on the float 10 may vary. Each light feature 12 may include many light sources (e.g., light emitting diodes (LEDs)). The number of light sources may vary from hundreds to thousands. The light sources may be continuously lit or lit occasionally (e.g., in a particular sequence or pattern). In addition, the light sources may have their intensity varied when utilized (e.g., via a dimmer). As depicted in FIG. 1, the float 10 includes features 14 that include mechanical elements that move as indicated by arrows 16. For example, the features 14 or a portion of the features 14 may rotate, move vertically, move horizontally, or in some other manner. The number of features 14 that include mechanical elements that move may vary. The float 10 may include other types of features that provide special effects (e.g., smoke, sound, etc.).

Many of the features (e.g., light features 12, features 14, etc.) on the float 10 require power to be utilized. When the float 10 is utilized in certain modes, some of the features (e.g., light features 12) may consume more power. For example, when the float is utilized in a static display mode (i.e., utilized in a stationary manner with the features being utilized), the features may consume power faster than the batteries can be charged. Besides the features on the float 10 related to the theme, the float 10 may include features related to the operation of the float that may need power (e.g., various LEDs related to a power system for the float 10). The features on the float 10 may also require the power to be provided at different voltages (e.g., 12 volts (V), 24V, 51V, etc.). Typically, this would involve needing many batteries (e.g., battery banks) at different voltages which can be expensive and take up a large amount of space.

The float 10 in FIG. 1 includes a large compartment or room 18 that houses components of a power system (e.g., switchable source float power system) for the float 10. The compartment 18 may house various enclosures for components of the power system. For example, the compartment 18 may include one or more enclosures for one or more battery banks and associated electrical components. The compartment 18 may also include one or more enclosures for one or more control panels for the power system and associated electrical components (e.g., switches, converters, etc.).

As noted above, the power system utilized with the float 10 may be a switchable source float power system. In particular, the power system is configured to switch between a first power source for powering the float 10 and a second power source for powering the float 10 (and its features) so that only a single power source is being utilized at a single time. The switching system enables a tool-free changeover between the different power sources. The switching is enabled due to one or more interlocked contactors (e.g., pairs of contactors interlocked via a mechanical interlock and electrical interlock so that only one contactor per interlocked pair can be closed (i.e., provides power) at a time). Each interlocked contactor utilizes a parallel bridge on an output side. The pair of contactors are interlocked and assembled in the configuration of a reversing contactor but without the crossover bridge for reversing AC motor. These features of the interlocked contactors enable the switching between the different power sources. Each power source is coupled to converters that provide power at proper output voltages (and sometimes different output voltages). In certain embodiments, the first power source and the second power source are different battery banks. In certain embodiments, the first power source is a battery bank and the second power source is an AC power source (e.g., building power from a building) that the float 10 is coupled to via standard wall circuits (i.e., electrical outlets). In the latter embodiment, the power system enables the float 10 to be powered in either a DC mode (via the battery bank) or an AC mode (via the AC power source).

The float 10 includes a wheeled chassis for transporting the float 10. In FIG. 1, the wheeled chassis includes tires 20 on wheels 22. In certain embodiments, the float 10 may be towed by another vehicle or an animal. In certain embodiments, the float 10 may include an engine (e.g., gasoline or electric engine) and be configured to be driven or self-propelled. In certain embodiments, the float 10 may be driven via remote control. In certain embodiments, the float 10 may be transported by other means (e.g., on a vessel (e.g., boat, barge, etc.) on the water).

The float 10 may be a parade float having a theme or scene. The float 10 may be utilized in an amusement park or outside an amusement park as part of a parade. In certain embodiments, the float 10 may be utilized as an advertisement.

Figure 2:
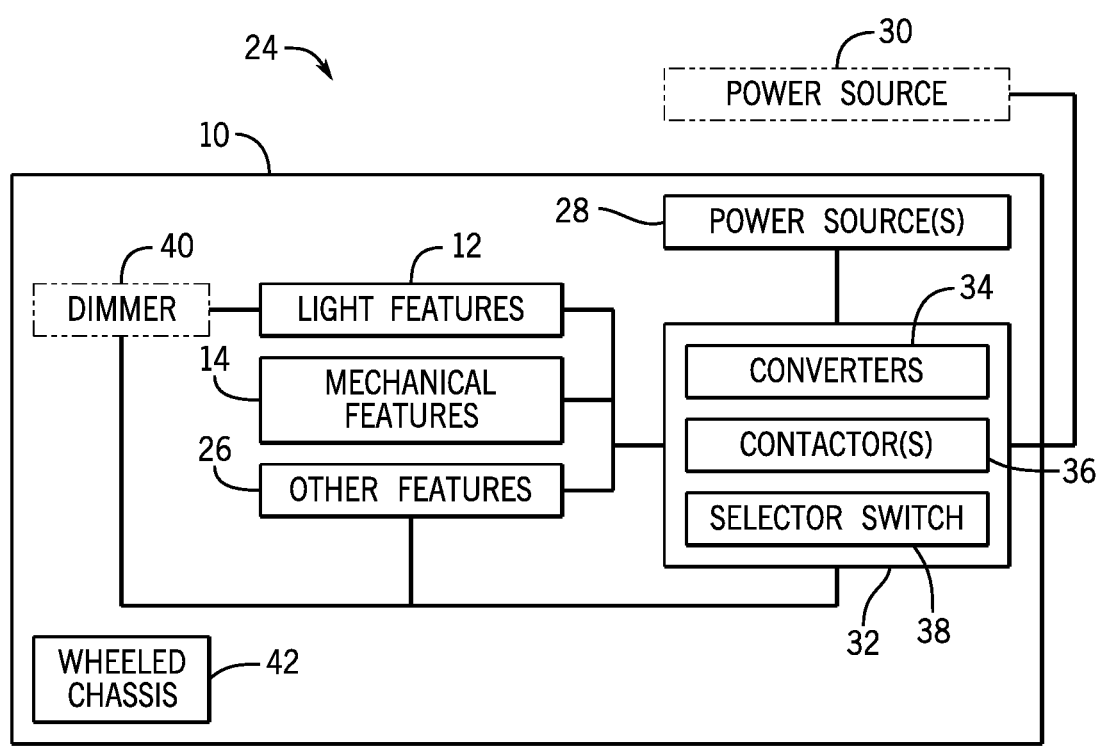
FIG. 2 is a schematic view of components of the float in FIG. 1 (including a power system), in accordance with an aspect of the present disclosure.

FIG. 2 is a schematic view of components of the float 10 in FIG. 1 (including a power system 24). The float 10 includes light features 12, actuated features 14 (e.g., mechanical elements that move, and other features 26 (e.g., components of the power system 24 (e.g., LED indicators, lights for control panels, etc.), special effects features, etc.) as described above. These may cumulatively be referred to as features 12, 14, 26.

The float 10 also includes the power system 24 (e.g., the switchable source float power system). The power system 24 powers the features 12, 14, 26 on the float 10. The power system 24 includes one or more power sources 28. The one or more power sources 28 on the float 10 include one or more battery banks configured to provide power. In certain embodiments, the power sources 28 (e.g., battery banks) on the float 10 may be the power sources that the power system 24 switches between when powering the float 10. In certain embodiments, the power system 24 may utilize power from a power source 30 separate from the float 10 (e.g., an AC power source such as building power from a building provided via coupling the float 10 to a standard wall circuit (i.e., electrical outlet) of the building). The power source 30 may also provide power to the float 10.

The power system 24 also includes various electrical components 32 for providing power from the power sources 28, 30 to the features 12, 14, 26 of the float 10. The electrical components 32 may include a plurality of converters 34. The converters 34 include a plurality of DC/DC converters to provide proper output voltages to the features 12, 14, 26 of the float 10 when the power system 24 is operating in DC mode (e.g., utilizing one or more battery banks for power). The converters 34 also include a plurality of AC/DC converters to provide proper output voltages to the features 12, 14, 26 of the float 10 when the power system 24 is operating in AC mode (e.g., utilizing an AC power source). One or more of the proper output voltages may be different.

The electrical components 32 also include one or more interlocked contactors 36 (e.g., pair of contactors interlocked and assembled in the configuration of a reversing contactor but without the crossover bridge for reversing AC motor. The converters 34 (e.g. both the DC/DC converters and the AC/DC converters are bound to one or more interlocked contactors 36). In certain embodiments, the converters 34 are located between and coupled to both the power sources 28, 30 and the one or more contactors 36. In certain embodiments, the converters 34 are coupled to the contactors 36 but located downstream of both the power sources 28, 30 and the one or more contactors 36. Each interlocked contactor 36 utilizes a parallel bridge on an output side. The electrical components 32 also include one or more selector switches 38 coupled to the one or more interlocked contactors 36. The one or more selector switches 38 are configured to enable selection of the power source 28, 30 to be utilized by the power system 24 in powering the features 12, 14, and 26 of the float 10. In certain embodiments, the selector switch 38 may be a signal from a computerized control system. The selection of the desired power source 28, 30 (e.g., via the selector switch 38) and the features of the interlocked contactor 36 enable the switching between the different power sources 28, 30. Other electrical components 32 may include contacts, distribution blocks, relays, circuit breakers, fuses, and other components.

In certain embodiments, some of the components of the power system 24 may act as a primary power system for the features 12, 14, 26. In certain embodiments, some of the components of the power system 24 may act as a secondary power system for other components of the float 10 (e.g., for a dimmer system 40). In certain embodiments, the dimmer system 40 may be coupled to one or more of the light features 12 to modulate the light features 12 (e.g., on/off, intensity of light emitted, etc.).

In certain embodiments, the float 10 may also include a wheeled chassis 42 for moving the float 10. The wheeled chassis 42 may include tires and wheels (e.g., tires 20 and wheels 22 in FIG. 1). As noted above, other means may be utilized for moving the float 10.

Figure 3:
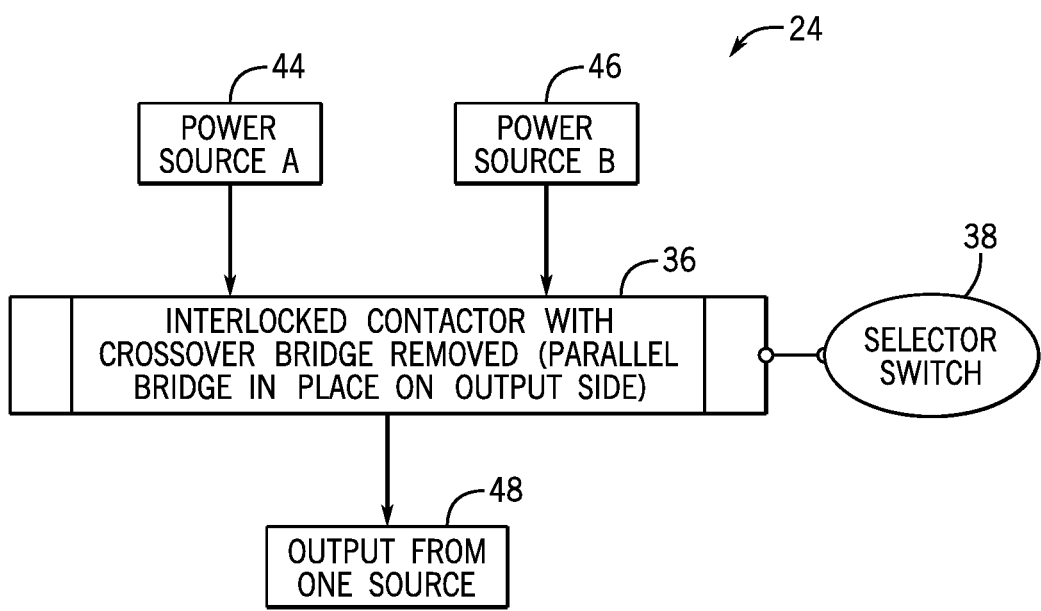
FIG. 3 is a schematic view of a switchable source flow power system for a float, in accordance with an aspect of the present disclosure.

FIG. 3 is a schematic view of the switchable source flow power system 24 for a float. The power system 24 includes a first power source 44 (e.g., power source A) and a second power source 46 (e.g., power source B). The first power source 44 and the second power source 46 provide power to the interlocked contactor 36. In certain embodiments, the first power source 44 may be a first battery bank and the second power source 46 may be a second battery bank. Each battery bank may be a high performance battery (e.g., having a higher power capacity with a denser charge ability and the ability to put out more amps). In certain embodiments, the first power source 44 may be a battery bank and the second power source 46 may be an AC power source (e.g., building power from a building) the float is coupled to via a standard electrical outlet.

The interlocked contactor 36 utilizes a parallel bridge on an output side. The selector switch 38 is coupled to the interlocked contactor 36. The selector switch 38 enables selection of a power source from among the first power source 44 and the second power source 46 to utilize in providing power to the float. The selection of the desired power source 44, 46 (e.g., via the selector switch 38) and the features of the interlocked contactor 36 enable the switching between the different power sources 44, 46. The power is outputted from a single source (as indicated by reference numeral 48) via the interlocked contactor 36. For example, when the first power source 44 is selected or switched to, power is only provided to the float utilizing the first power source 44. When the second power source 46 is selected or switched to, power is only provided to the float utilizing the second power source 46.

In certain embodiments, a plurality of converters are disposed between and coupled to one of the power sources 44, 46 and the interlocked contactor 36. When the first power source 44 is a battery bank, the converters include a plurality of DC/DC converters coupled to the first power source 44 and the interlocked contactor 36, where the DC/DC converters provide proper output voltages to the float when the power system 24 is operating in DC mode (e.g., utilizing one or more battery banks for power). When the second power source 46 is an AC power source (e.g., building power), the converters include a plurality of AC/DC converters coupled to the second power source 46 and the interlocked contactor 36, where the AC/DC converters provide proper output voltages to the float when the power system 224 is operating in AC mode (e.g., utilizing an AC power source such as building power for power). One or more of the proper output voltages may be different.

Figure 4:
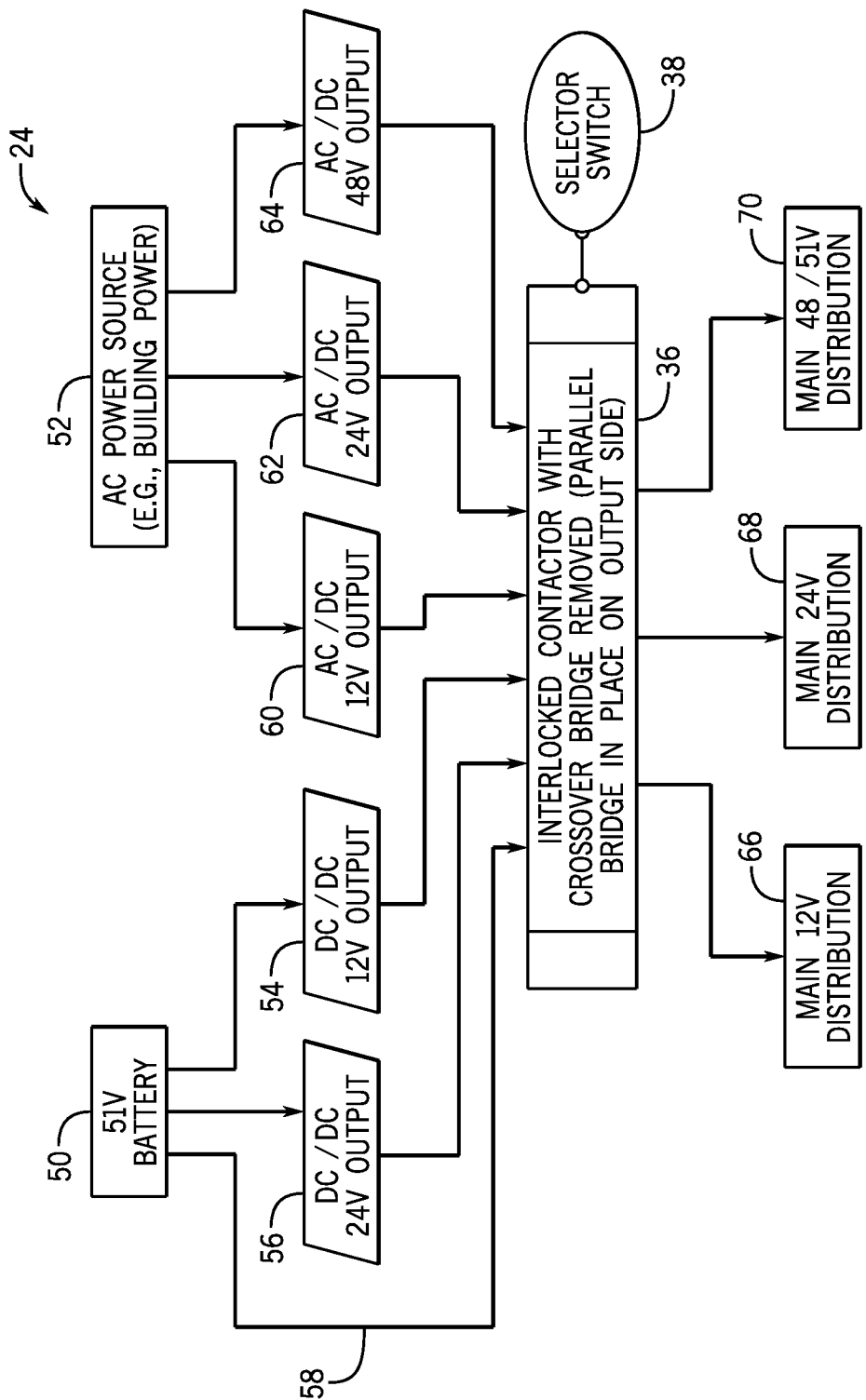
FIG. 4 is a schematic view of a switchable source flow power system (e.g., utilizing battery power and an AC power source such as building power) for a float, in accordance with an aspect of the present disclosure.

FIG. 4 is a schematic view of a switchable source flow power system 24 (e.g., utilizing battery power and an AC power source) for a float. The power system 24 includes a battery bank 50 and AC power source 52 (e.g., building power from a building the float is coupled to via a standard electrical outlet). The battery bank 50 may be a high performance battery. As depicted, the battery bank 50 is a 51V battery bank. The voltage of the battery bank may vary. DC/DC converters may be utilized for outputting proper voltage outputs from the battery bank 50. For example, the proper voltage outputs may be 12V (as indicated by reference numeral 54) and 24V (as indicated by reference numeral 56). The battery bank 50 also outputs the voltage at 51V (as indicated by reference numeral 58). DC/DC converters may be utilized for outputting another proper voltage output (e.g., 48V). The power system 24 includes the interlocked contactor 36. The different voltage outputs are provided to the interlocked contactor 36.

The AC power from the AC power source 52 (e.g., building). DC/DC converters may be utilized for outputting proper voltage outputs from the AC power source 52. For example, proper voltage outputs may be 12V (as indicated by reference numeral 60), 24V (as indicated by reference numeral 62), and 48V (as indicated by reference numeral 64). The battery bank 50 also outputs the voltage at 51V (as indicated by reference numeral 58). The power system 24 includes the interlocked contactor 36. The different voltage outputs of are provided to the interlocked contactor 36.

The interlocked contactor 36 utilizes a parallel bridge on an output side. In addition, the interlocked contactor 36 lacks a crossover bridge for crossing over AC phases. The selector switch 38 is coupled to the interlocked contactor 36. The selector switch 38 enables selection of a power source from among the battery bank 50 and the AC power source 52 to utilize in providing power to the float. The selection of the desired power source (i.e., the battery bank 50 or the AC power source 52), via the selector switch 38, and the features of the interlocked contactor 36 enable the switching between the battery bank 50 and the AC power source 52. The power is outputted from a single source (either the battery bank 50 or the AC power source 52) via the interlocked contactor 36 at different voltage distributions main 12V distribution 66, main 24V distribution 68, and main 48/51V distribution 70. When the battery bank 50 is selected or switched to, power is only provided to the float utilizing the battery bank 50. When the AC power source 52 is selected or switched to, power is only provided to the float utilizing the AC power source 52.

Figure 5A:
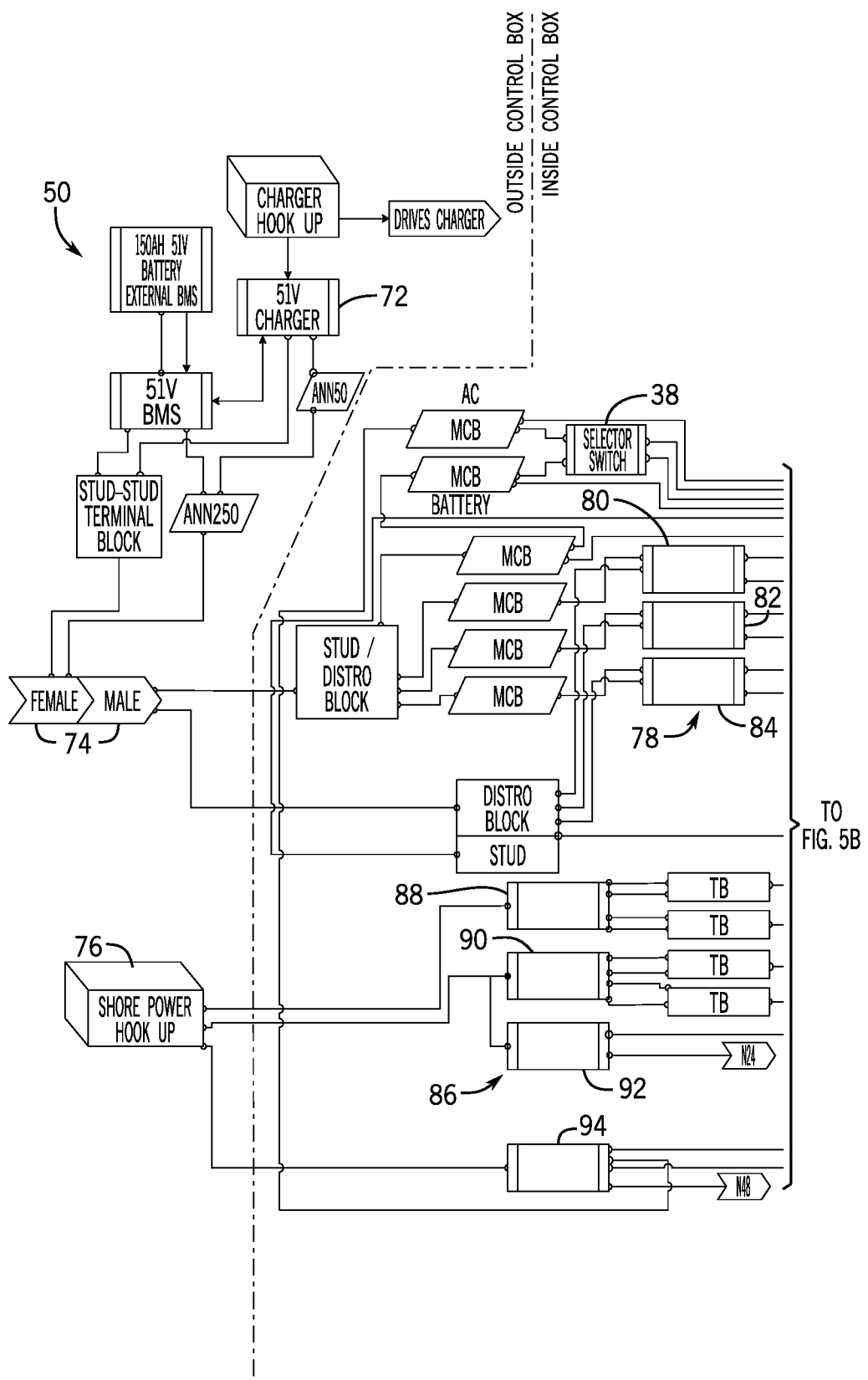
FIGS. 5A-5C are schematic views of a power system for a float, in accordance with an aspect of the present disclosure.
Figure 5B:
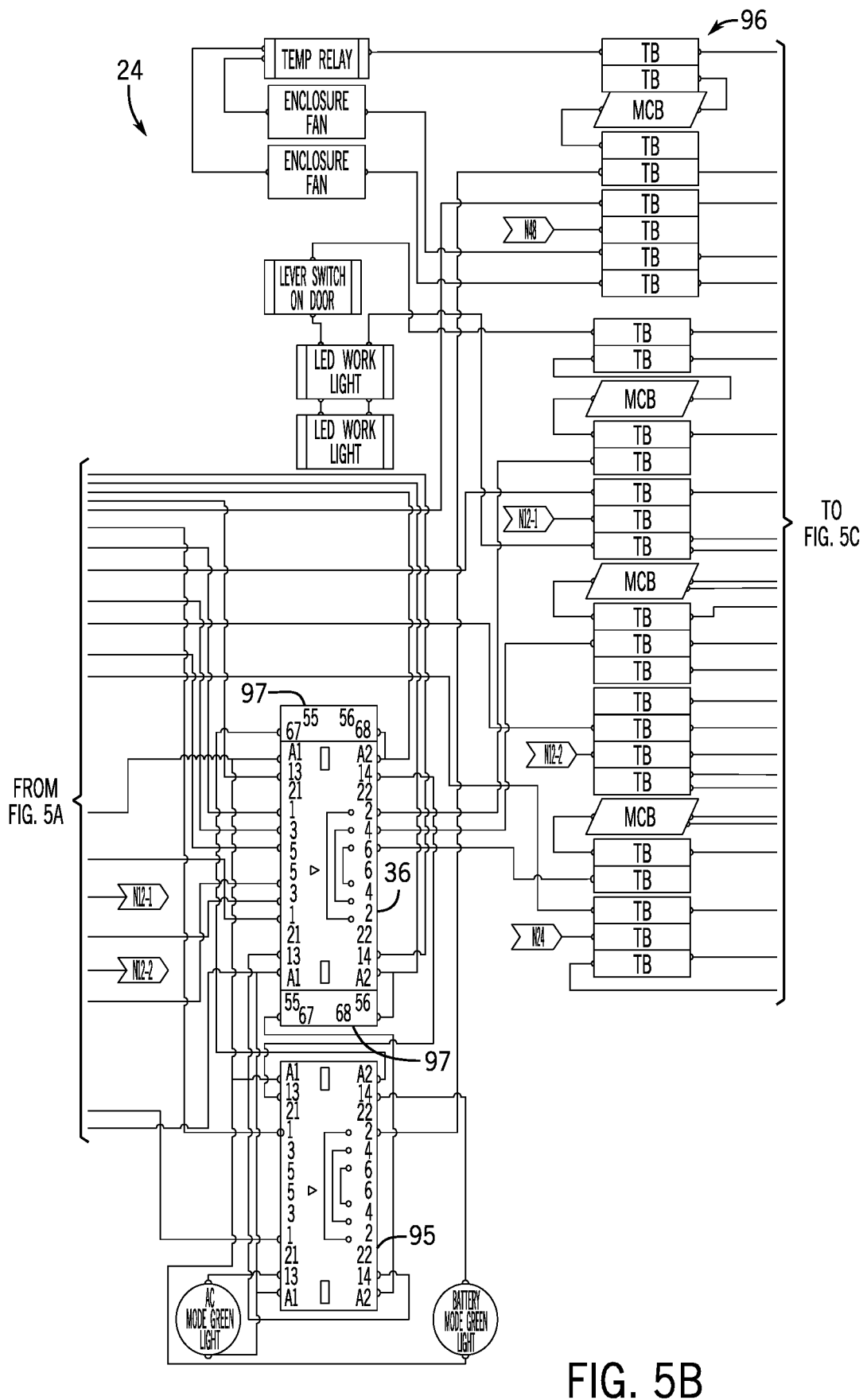
Figure 5C:
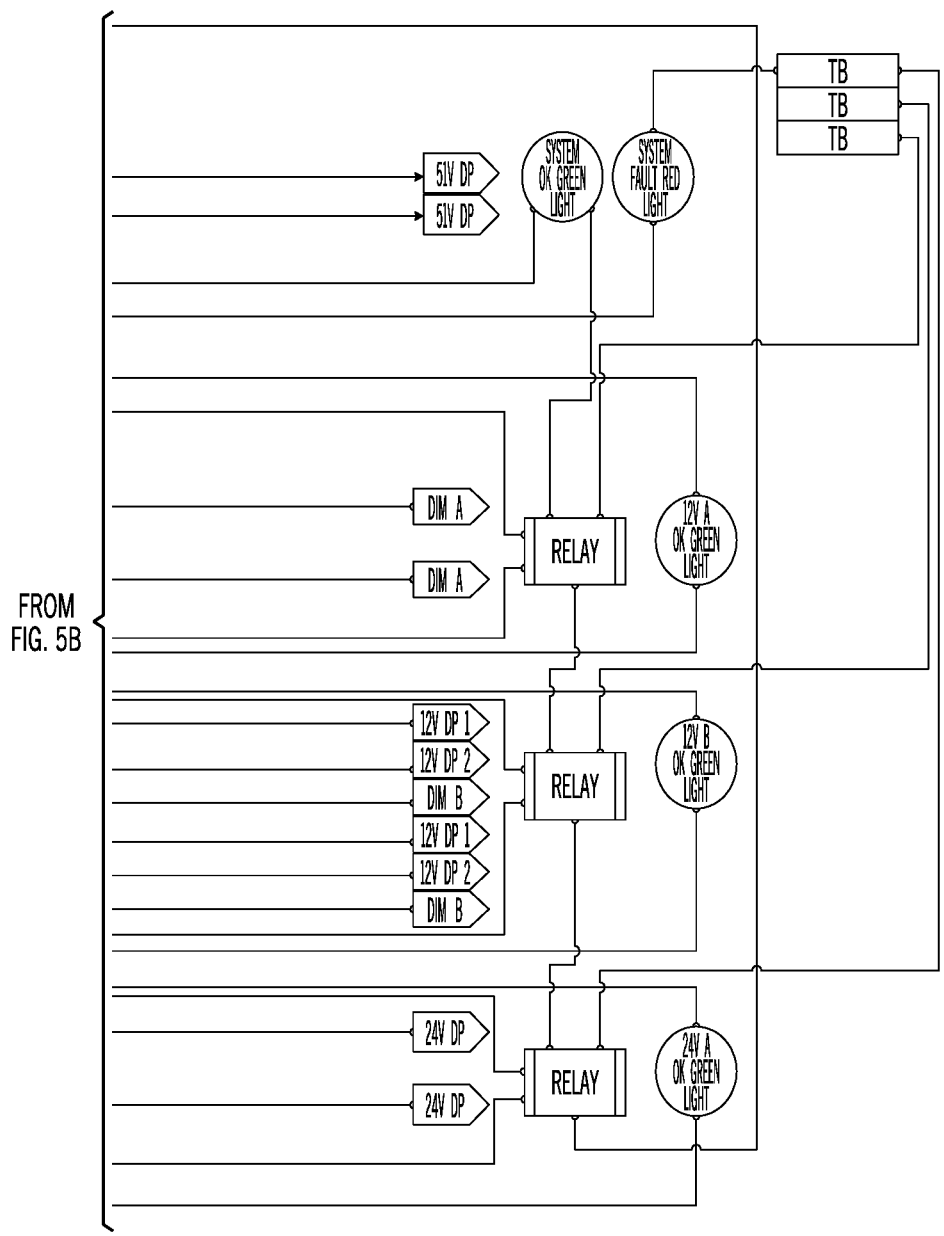

The configurations of the power systems for the float may vary. FIGS. 5-7 illustrate different schematic views of power systems for floats. FIGS. 5A-5C are schematic views of the power system 24 for a float. The power system 24 includes the battery bank 50 (e.g., 51V battery bank) located outside a control box. The battery bank 50 is coupled to a charger 72. The battery bank 50 is coupled to electrical components within the control box via connectors 74. Also, located outside the control box, the power system 24 includes a hook up 76 for AC power (e.g., building power or shore power).

The power from the battery bank 50 is provided to DC/DC converters 78 that ensure that the proper output voltage is provided from the battery bank 50. As depicted, the DC/DC converters 78 include a couple of DC/DC converters 80, 82 for outputting at 12V and a single DC/DC converter 84 for outputting at 24V. Besides the battery bank 50, the DC/DC converters 78 are also coupled to the interlocked contactor 36.

The power from the AC power source via the hook up 76 is provided to AC/DC converters 86 that ensure that the proper output voltage is provided from the AC power source. As depicted, the AC/DC converters 86 include a couple of AC/DC converters 88, 90 for outputting at 12V, a single AC/DC converter 92 for outputting at 24V, and a single AC/DC converter 94 for outputting at 48V. Besides the AC power source (via the hook up 76), the AC/DC converters 86 are also coupled to the interlocked contactor 36. Some of the DC/DC converters 78 and the AC/DC converters 86 are coupled to an additional interlocked contactor 95.

The interlocked contactors 36, 95 utilize a parallel bridge on an output side. In addition, the interlocked contactors 36 lack crossover bridges for crossing over AC phases. The power system 24 includes the selector switch 38 coupled to the interlocked contactors 36, 95. The selector switch 38 enables selection of a power source from among the battery bank 50 and the AC power source to utilize in providing power to the float. The selection of the desired power source (i.e., the battery bank 50 or the AC power source), via the selector switch 38, and the features of the interlocked contactor 36, 95 enable the switching between the battery bank 50 and the AC power source. The power is outputted from a single source (either the battery bank 50 or the AC power source) via the interlocked contactors 36, 95 at different voltage distributions (e.g., 12V, 24V, and 51V as depicted in FIGS. 5A-5C). When the battery bank 50 is selected or switched to, power is only provided to the float utilizing the battery bank 50. When the AC power source is selected or switched to, power is only provided to the float utilizing the AC power source. It should be noted that the contactor 36 includes on each side time delay auxiliary contact blocks 97. The time delay auxiliary contact blocks 97 are utilized on floats with 2 or more contactors. The time delay auxiliary contacts blocks 97 are configured to prevent a major current spike from occurring when switching modes by forcing a slight pause in how quickly the second contactor can enable.

The power from the selected power source is provided to an output rail 96 for distribution to various components of the float. The power system 24 may include various other components such as distribution blocks, terminal blocks (TB), miniature circuit breakers (MCB), fuses, relays, LEDs (e.g., as indicator lights, working lights, etc.), fans, and other components.

Figures 1, 6A:
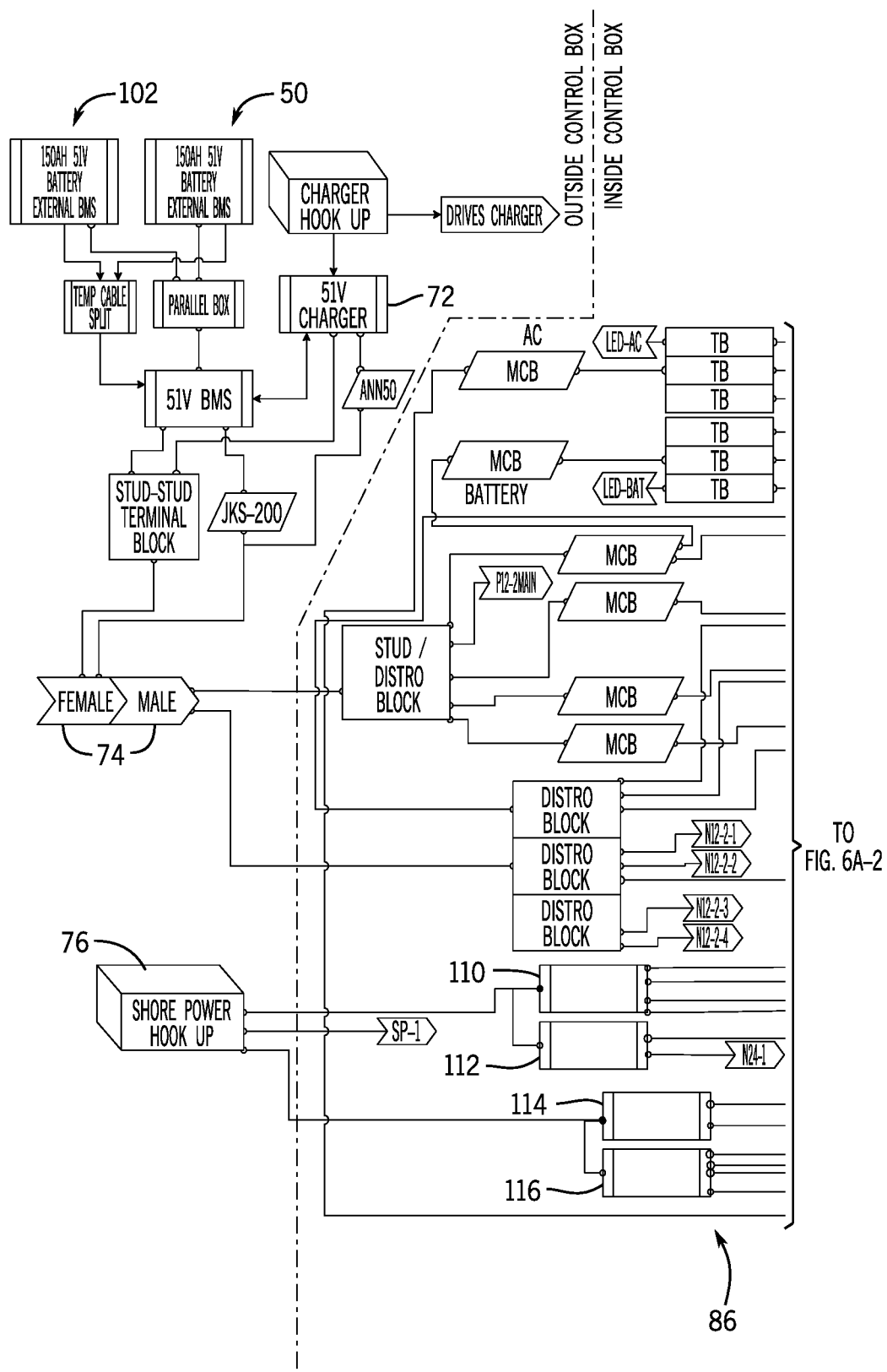
Figures 2, 6A:
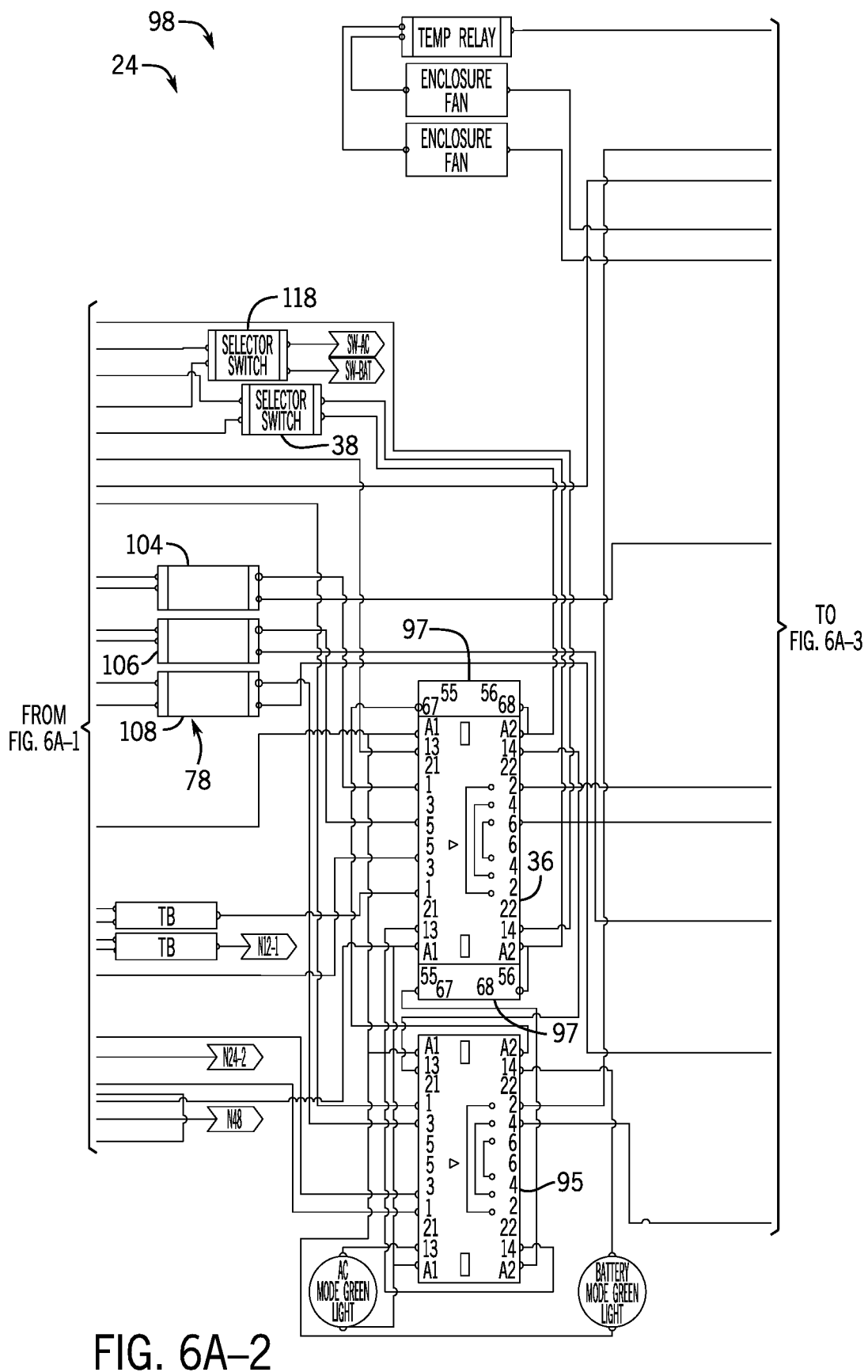
Figures 3, 6A:
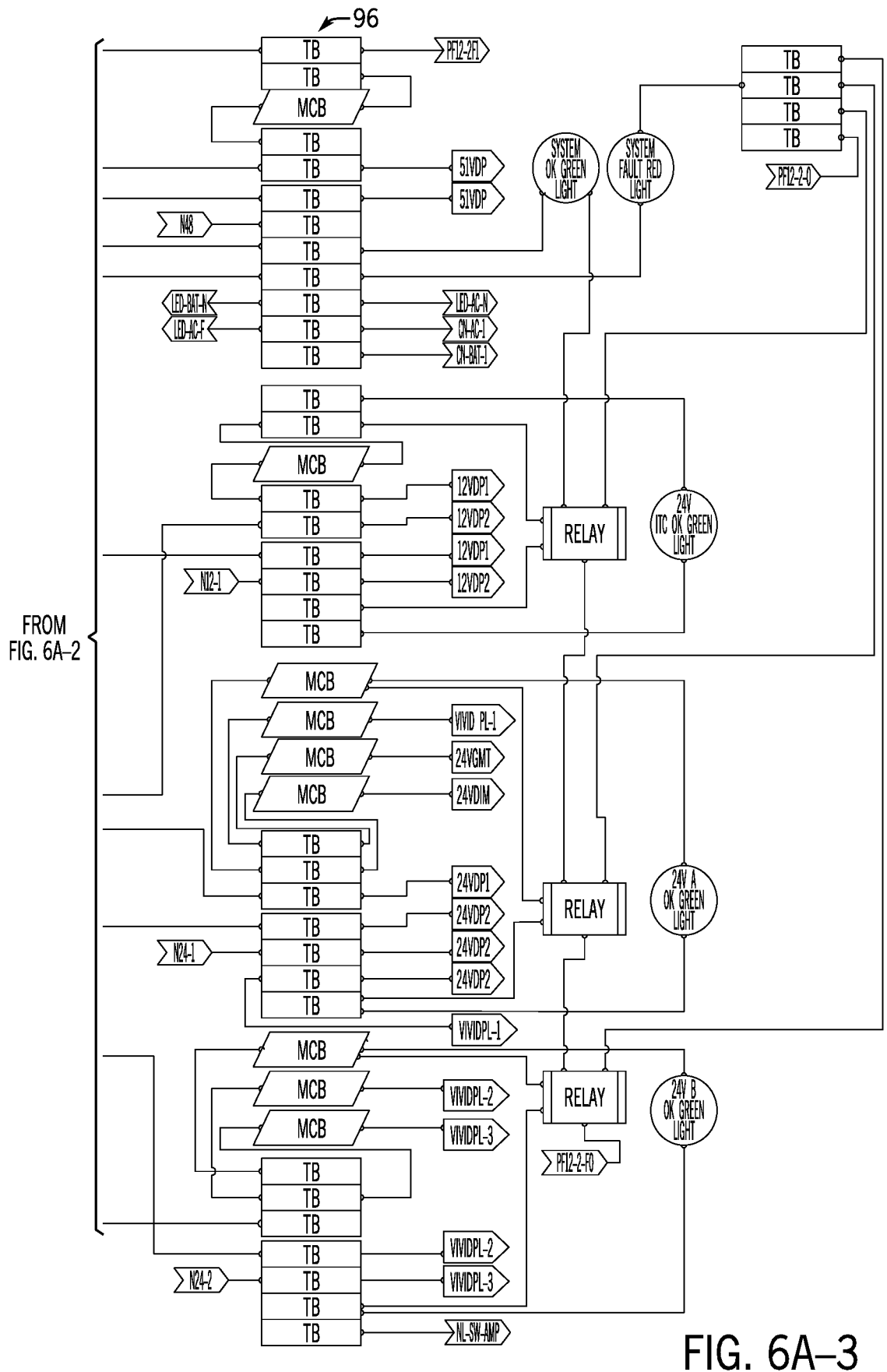
Figures 1, 6B:
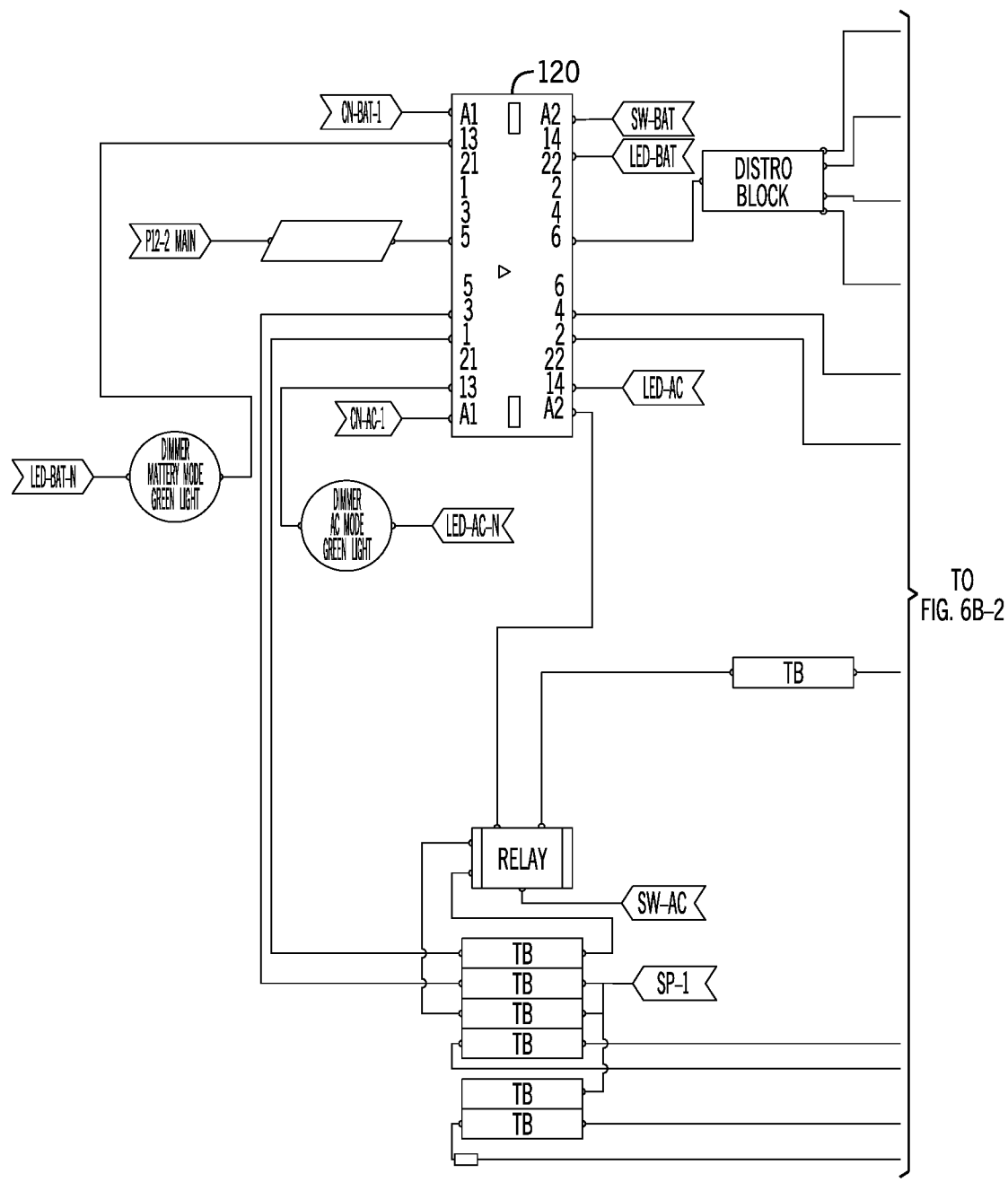
Figures 2, 6B:
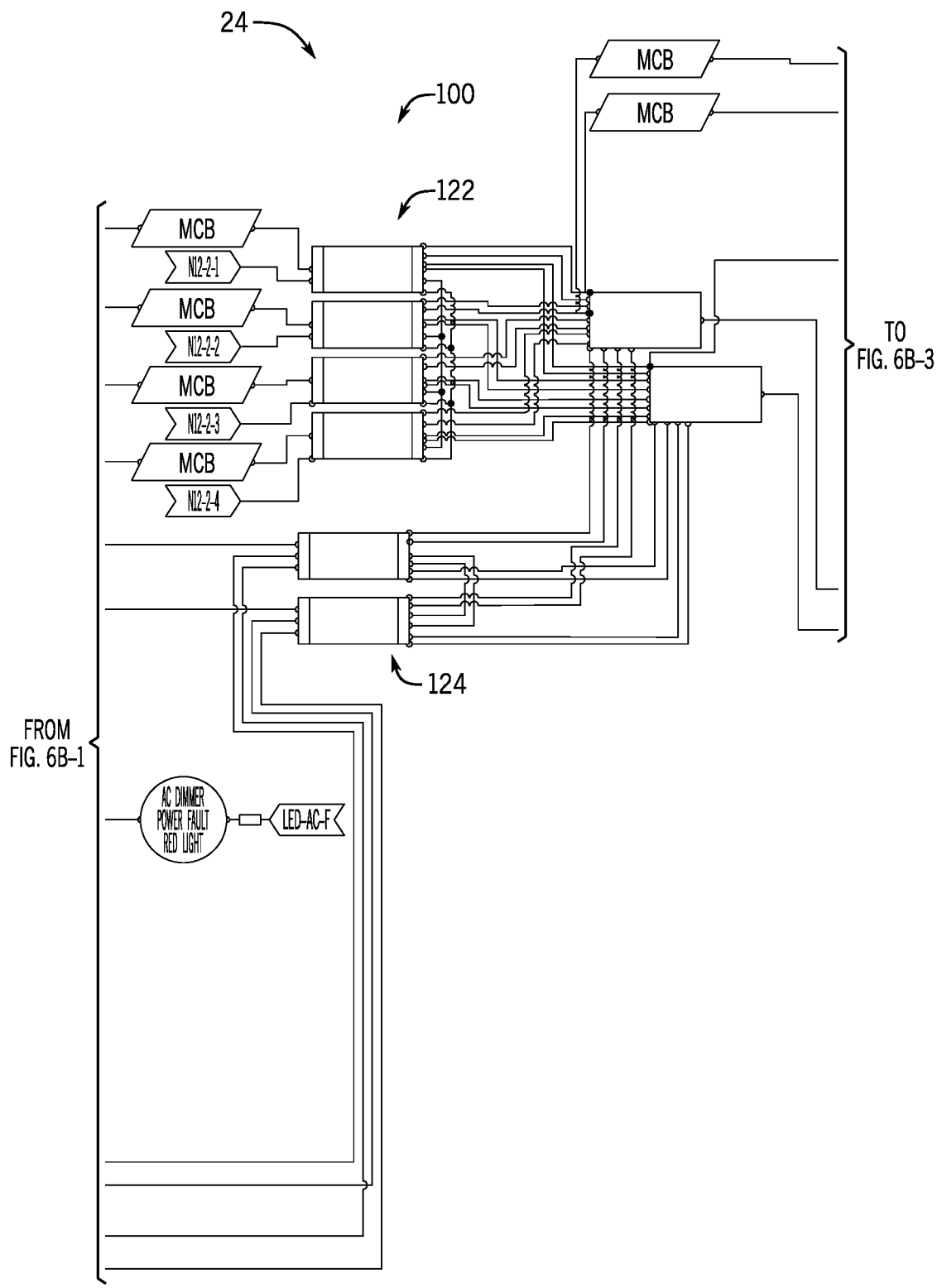
Figures 3, 6B:
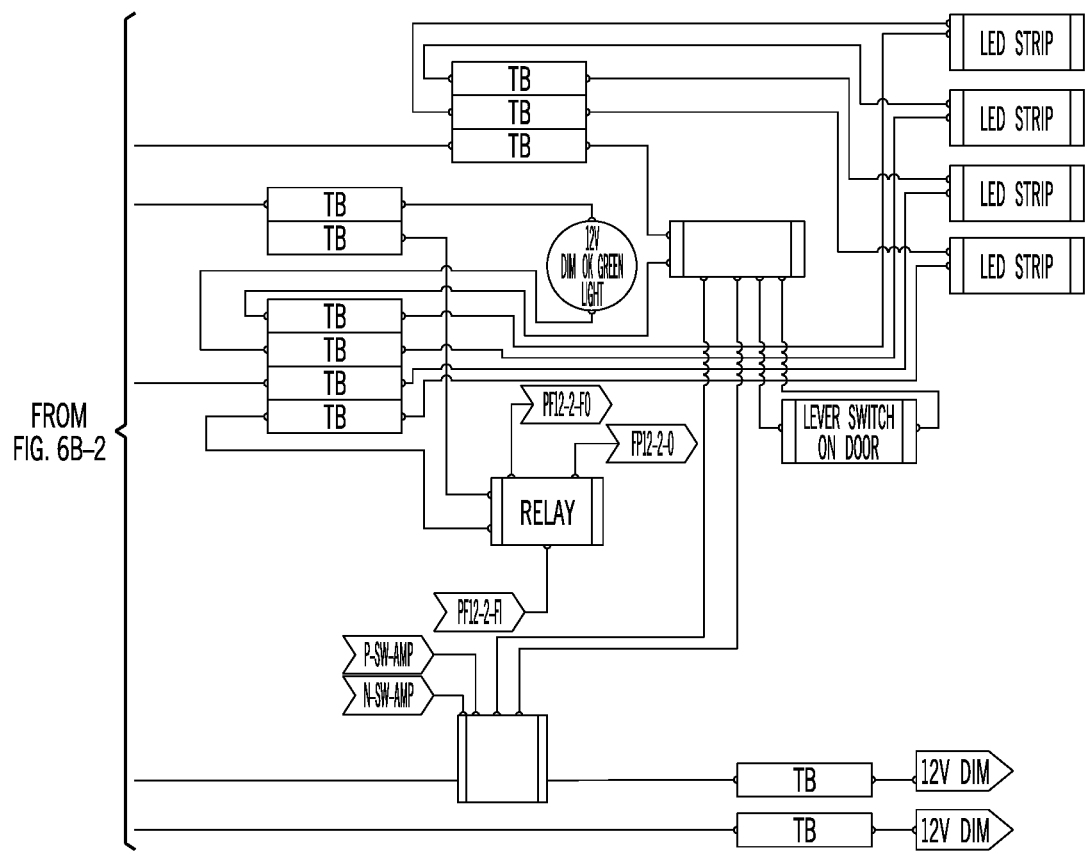

FIGS. 6A and 6B are schematic views of the power system 24 for a float. FIGS. 6A-1, 6A-2, and 6A-3 illustrate a primary power system 98 of the power system 24. FIGS. 6B-1, 6B-2, and 6A-3 illustrate an additional or secondary power system 100 of the power system 24 for a dimmer system. The primary power system 98 includes the battery bank 50 (e.g., 51V battery bank) and an additional battery bank 102 located outside a control box. In certain embodiments, the battery banks 50, 102 may be located inside the control box. The battery banks 50, 102 are coupled to a charger 72. The battery banks 50, 102 are coupled to electrical components within the control box via connectors 74. Also, located outside the control box, the power system 24 includes a hook up 76 for AC power (e.g., building power or shore power.

The power from the battery banks 50, 102 is provided to DC/DC converters 78 that ensure that the proper output voltage is provided from the battery banks 50, 102. As depicted, the DC/DC converters 78 include a single DC/DC converter 104 for outputting at 12V and a couple of DC/DC converters 106, 108 for outputting at 24V. Besides the battery banks 50, 102, the DC/DC converters 78 are also coupled to the interlocked contactor 36.

The power from the AC power source via the hook up 76 is provided to AC/DC converters 86 that ensure that the proper output voltage is provided from the AC power source. As depicted, the AC/DC converters 86 include a single AC/DC converter 110 for outputting at 12V, a couple of AC/DC converters 112, 114 for outputting at 24V, and a single AC/DC converter 116 for outputting at 48V. Besides the AC power source (via the hook up 76), the AC/DC converters 86 are also coupled to the interlocked contactor 36. Some of the DC/DC converters 78 and the AC/DC converters 86 are coupled to an additional interlocked contactor 95.

The interlocked contactors 36, 95 utilize a parallel bridge on an output side. In addition, the interlocked contactors 36, 95 lack a crossover bridge for crossing over AC phases. The power system 24 includes the selector switch 38 (e.g., for the primary power system 98) coupled to the interlocked contactors 36, 95. The selector switch 38 enables selection of a power source from among the battery banks 50, 102 and the AC power source to utilize in providing power to the float. The selection of the desired power source (i.e., the battery banks 50, 102 or the AC power source), via the selector switch 38, and the features of the interlocked contactor 36, 95 enable the switching between the battery banks 102 and the AC power source. The power is outputted from a single source (either the battery banks 50, 102 or the AC power source) via the interlocked contactors 36, 95 at different voltage distributions (e.g., 12V, 24V, and 51V as depicted in FIGS. 6A-1, 6A-2, and 6A-3). When the battery banks 50, 102 are selected or switched to, power is only provided to the float utilizing the battery banks 50, 102. When the AC power source is selected or switched to, power is only provided to the float utilizing the AC power source. The power from the selected power source is provided to an output rail 96 for distribution to various components of the float. It should be noted that the contactor 36 includes on each side time delay auxiliary contact blocks 97. The time delay auxiliary contact blocks 97 are utilized on floats with 2 or more contactors. The time delay auxiliary contacts blocks 97 are configured to prevent a major current spike from occurring when switching modes by forcing a slight pause in how quickly the second contactor can enable.

The power system 24 also includes an additional selector switch 118 (shown in FIG. 6A-2) that enables the selection of the power source from among the battery banks 102 and the AC power source to be utilized in the additional power system 100 for the dimmer system. The selection (via the selector switch 118) enables an interlocked contactor 120 (shown in FIG. 6B-1) to switch between the battery banks 50, 102 and the AC power source for receiving power to the secondary power system 100 with the selected power source. In DC mode when power is selected from the battery banks 50, 102, the power is provided to DC/DC converters 122 (shown in FIG. 6B-2) for providing proper output voltages to components of the dimmer system. In AC mode when power is selected from the AC power source, the power is provided to AC/DC converters 124 (shown in FIG. 6B-2) for providing components of the dimmer system. The interlocked contactors 120 has both the crossover and parallel bridges removed. The interlocked contactor 120 is interlocked to ensure only one power source can be energized at a time.

The power system 24 may include various other components such as distribution blocks, terminal blocks (TB), miniature circuit breakers (MCB), fuses, relays, LEDs (e.g., as indicator lights, working lights, etc.), fans, and other components.

Figure 7A:
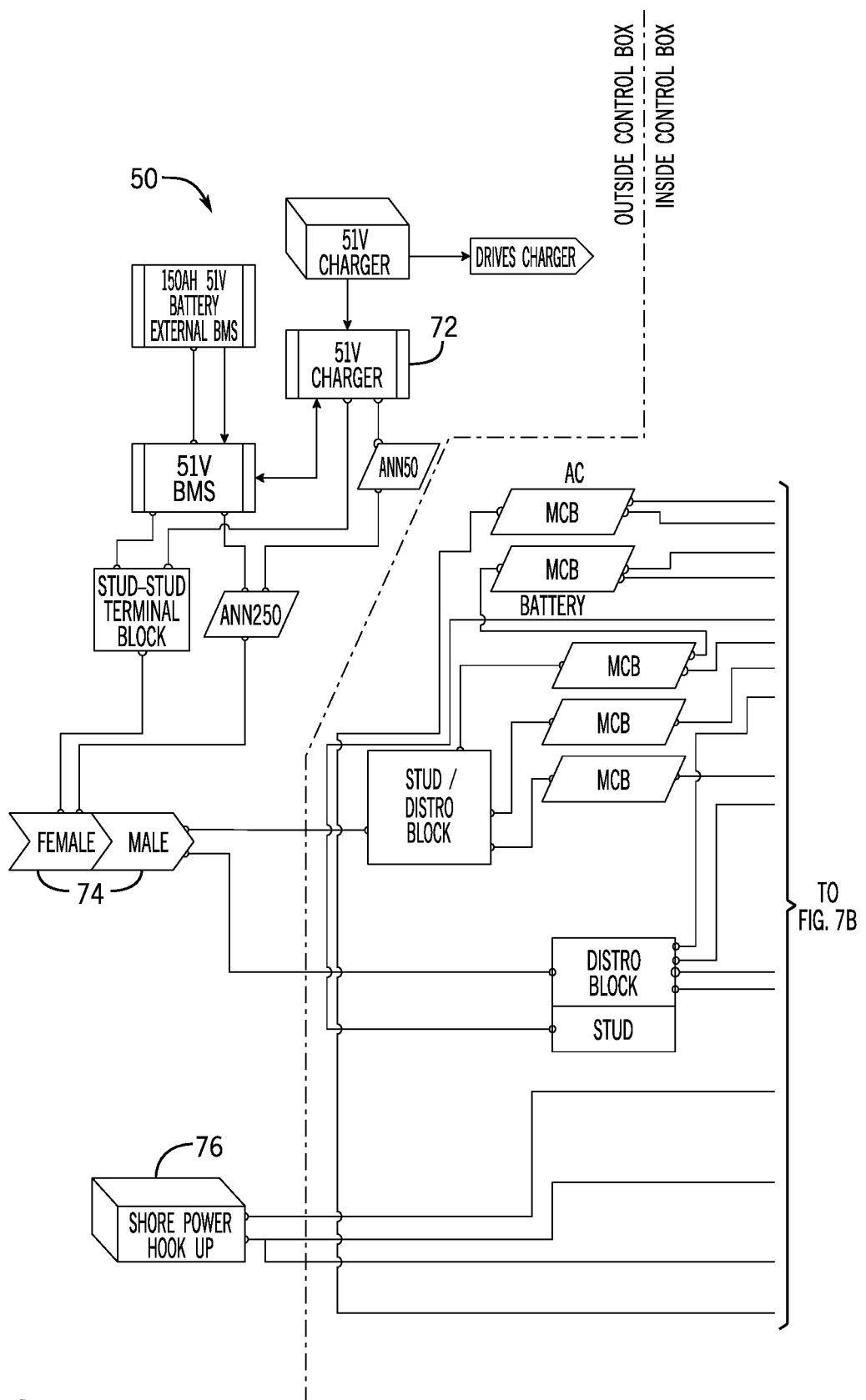
FIGS. 7A-7C are schematic views of a power system for a float (e.g., having a single interlocked contactor), in accordance with an aspect of the present disclosure.
Figure 7B:
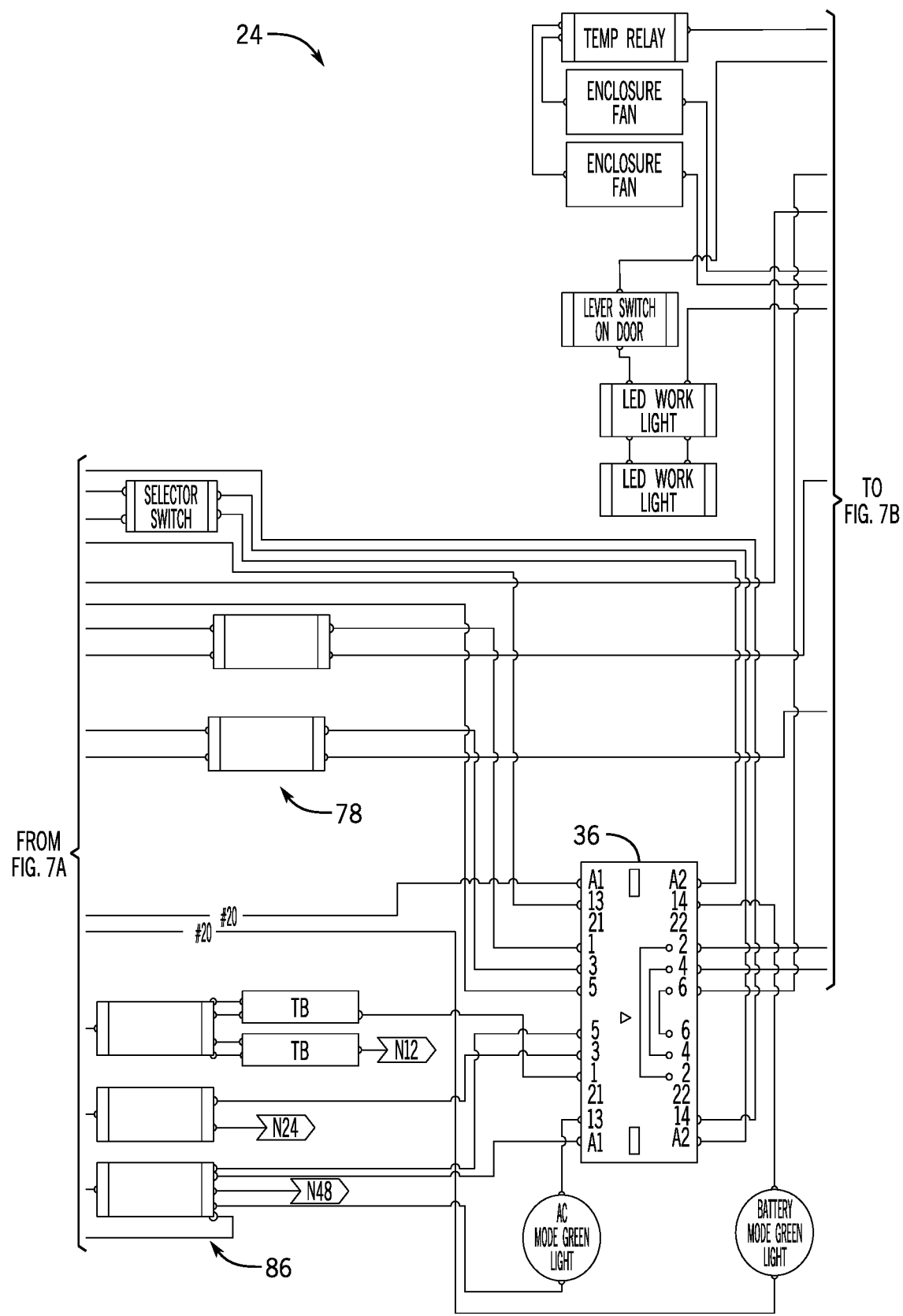
Figure 7C:
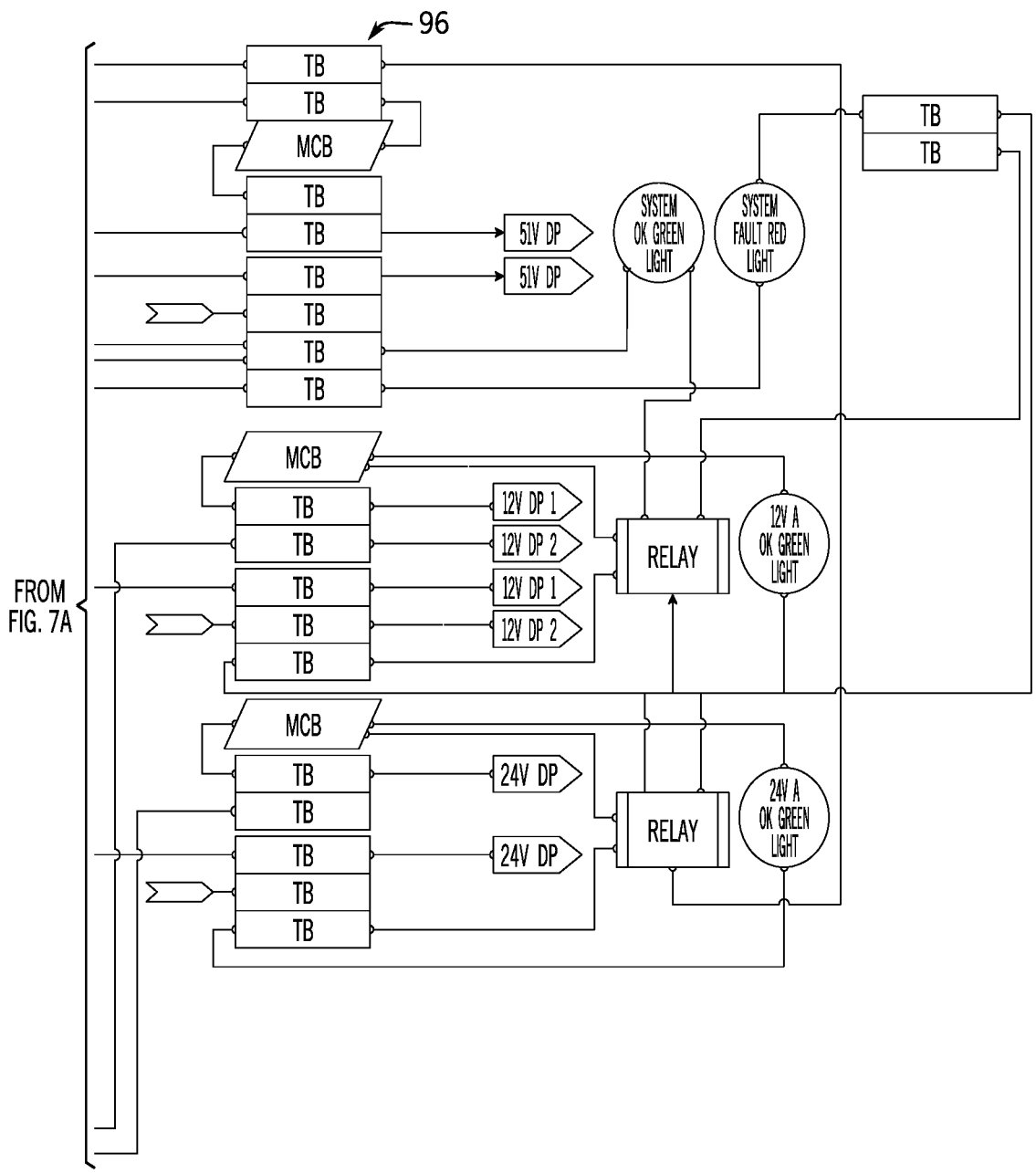

FIGS. 7A-7C are schematic views of a power system 24 for a float (e.g., having a single interlocked contactor). The power system 24 in FIGS. 7A-7C is similar to the power system 24 in FIGS. 5A-5C. The power system 24 in FIGS. 7A-7C includes a single interlocked contactor 36 coupled to each of the DC/DC converters 78 and each of the AC/DC converters 86.

Figure 8:
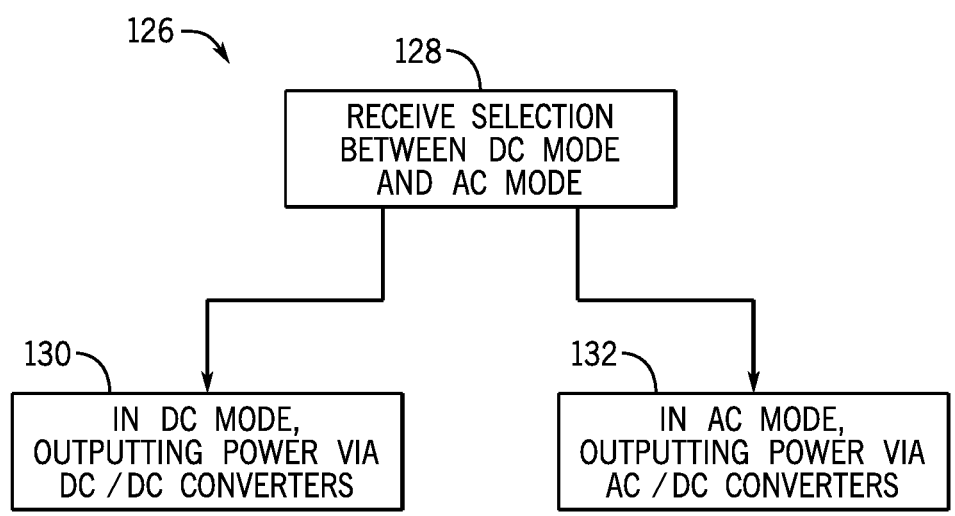
FIG. 8 is a method for controlling a power system for a float, in accordance with an aspect of the present disclosure.

FIG. 8 is a method 126 for controlling a power system (e.g., power system 24 in FIGS. 2-7) for a float (e.g., parade float). The method includes receiving, via a selector switch coupled to an interlocked contactor, a selection of a power mode from among alternating current (AC) mode and direct current (DC) mode (block 128). The interlocked contactor is coupled to a plurality of DC/DC converters and a plurality of AC/DC converters. The plurality of the DC/DC converters and the plurality of AC/DC converters are configured to provide power at proper output voltages to the float. When the DC mode is selected, the method 126 includes outputting power to the float via the plurality DC/DC converters coupled to a battery bank located on the float (block 130). When the AC mode is selected, the method 126 includes outputting power to the float via the plurality of AC/DC converters coupled to an AC power source (block 132). The interlocked contactor enables only a single power source at a time from among the battery bank and the AC power source to power the float.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosed subject matter.

The invention claimed is:

1. A power system for a parade float, the power system comprising:
   a first power source;
   a second power source;
   an interlocked contactor comprising a pair of contactors interlocked via a mechanical interlock and an electrical interlock, wherein the interlocked contactor is in a configuration of a reversing contactor but lacks a crossover bridge for crossing over alternating current (AC) phases;

a selector switch coupled to the interlocked contactor, wherein the interlocked contactor is configured, in response to selection of a power source from among the first power source and the second power source with the selector switch, to switch between the first power source and the second power source for outputting power to the parade float with the selected power source;

one or more direct current (DC)/DC converters coupled to both the first power source and the interlocked contactor and configured to provide power at proper output voltages to the parade float when the first power source is selected;

one or more AC/DC converters coupled to the interlocked contactor and configured to couple to the second power source and to provide power at the proper output voltages to the parade float when the second power source is selected; and an additional interlocked contactor coupled to at least one DC/DC converter of the one or more DC/DC converters, to at least one AC/DC converter of the one or more AC/DC converters, and to the selector switch.

2. The power system of claim 1, wherein the first power source comprises a first battery bank and the second power source comprises a second battery bank.

3. The power system of claim 1, wherein the first power source comprises a battery bank and the second power source comprises an AC power source from a building.

4. The power system of claim 1, wherein one or more of the proper output voltages are different.

5. The power system of claim 1, wherein the power system is configured to power the parade float with only one power source at a time from among the first power source and the second power source.

6. A parade float, comprising:
a power system, comprising:
a battery bank;
a plurality of direct current (DC)/DC converters coupled to the battery bank and configured to provide power at proper output voltages to the parade float;
a plurality of alternating current (AC)/DC converters configured to couple to an AC power source and to provide power at the proper output voltages to the parade float;
an interlocked contactor coupled to at least one DC/DC converter of the plurality of DC/DC converters and to at least one AC/DC converter of the plurality of AC/DC converters;
a selector switch coupled to the interlocked contactor, wherein the interlocked contactor is configured, in response to selection of a power source from among the battery bank and the AC power source with the selector switch, to switch between the battery bank and the AC power source for outputting power to the parade float with the selected power source; and
an additional interlocked contactor coupled to at least one DC/DC converter of the plurality of DC/DC converters, to at least one AC/DC converter of the plurality of AC/DC converters, and to the selector switch.

7. The parade float of claim 6, wherein the interlocked contactor lacks a crossover bridge for crossing over AC phases.

8. The parade float of claim 6, wherein one or more of the proper output voltages are different.

9. The parade float of claim 6, wherein the power system is configured to power the parade float with only one power source at a time from among the battery bank and the AC power source.

10. The parade float of claim 6, the parade float comprising an additional battery bank coupled to the plurality of DC/DC converters.

11. The parade float of claim 6, comprising a plurality of light features, wherein the power system is configured to power the plurality of light features.

12. A method for controlling a power system for a parade float, the method comprising:
receiving, via a selector switch coupled to an interlocked contactor, a selection of a power mode for a primary power system of the parade float from among alternating current (AC) mode and direct current (DC) mode, wherein the interlocked contactor is coupled to a plurality of DC/DC converters and a plurality of AC/DC converters, and the plurality of the DC/DC converters and the plurality of AC/DC converters are configured to provide power at proper output voltages to the parade float, wherein the interlocked contactor comprises a pair of contactors interlocked via a mechanical interlock and an electrical interlock, and the interlocked contactor is in a configuration of a reversing contactor but lacks a crossover bridge for crossing over alternating current phases;

in response to the DC mode being selected, outputting power to the parade float via the plurality DC/DC converters coupled to a battery bank located on the parade float;

in response to the AC mode being selected, outputting power to the parade float via the plurality of AC/DC converters coupled to an AC power source, wherein the interlocked contactor enables only a single power source at a time from among the battery bank and the AC power source to power the parade float;

receiving, via an additional selector switch coupled to an additional interlocked contactor, an additional selection of an additional power mode for a secondary power system of the parade float from among the battery bank and the AC power source, wherein the additional interlocked contactor is coupled to the battery bank and is configured to couple to the AC power source; and in response to selecting from among the battery bank and the AC power source, switching between the battery bank and the AC power source for receiving power to the secondary power source with the selected power source.

13. A parade float, comprising:
a power system, comprising:
a battery bank;
a plurality of direct current (DC)/DC converters coupled to the battery bank and configured to provide power at proper output voltages to the parade float;
a plurality of alternating current (AC)/DC converters configured to couple to an AC power source and to provide power at the proper output voltages to the parade float;
an interlocked contactor coupled to at least one DC/DC converter of the plurality of DC/DC converters and to at least one AC/DC converter of the plurality of AC/DC converters; and
a selector switch coupled to the interlocked contactor, wherein the interlocked contactor is configured, in response to selection of a power source from among the battery bank and the AC power source with the selector switch, to switch between the battery bank and the AC power source for outputting power to the parade float with the selected power source; and wherein the power system comprises a primary power system, and the parade float comprises a secondary power system, the secondary power system comprising:

an additional interlocked contactor coupled to the battery bank and configured to couple to the AC power source; and an additional selector switch; and wherein the additional interlocked contactor is configured, in response to selection of the power source from among the battery bank and the AC power source with the additional selector switch, to switch between the battery bank and the AC power source for receiving power to the secondary power system with the selected power source.

* * * * *